United States Patent
Soofi et al.

(10) Patent No.: US 10,590,283 B2
(45) Date of Patent: Mar. 17, 2020

(54) METHOD OF PROVIDING A PROTECTIVE COATING COMPOSITION FOR MOLTEN ALUMINUM AND ALKALI METAL ENVIRONMENTS

(71) Applicant: Magenco/Metrel, Inc., Addison, IL (US)

(72) Inventors: Madjid Soofi, Elgin, IL (US); Lara Binz, Volo, IL (US); Michael W. Anderson, West Chicago, IL (US)

(73) Assignee: Magneco/Metrel, Inc., Addison, IL (US)

( * ) Notice: Subject to any disclaimer, the term of this patent is extended or adjusted under 35 U.S.C. 154(b) by 10 days.

(21) Appl. No.: 15/439,885

(22) Filed: Feb. 22, 2017

(65) Prior Publication Data

US 2018/0044540 A1    Feb. 15, 2018

Related U.S. Application Data

(63) Continuation-in-part of application No. 15/235,774, filed on Aug. 12, 2016, now abandoned.

(51) Int. Cl.

| | | |
|---|---|---|
| C04B 41/00 | (2006.01) | |
| C04B 41/50 | (2006.01) | |
| C09D 105/00 | (2006.01) | |
| C09D 5/08 | (2006.01) | |
| C09D 7/00 | (2018.01) | |
| C09D 7/43 | (2018.01) | |
| C09D 7/40 | (2018.01) | |
| C09D 7/61 | (2018.01) | |
| C04B 41/85 | (2006.01) | |
| C08K 3/36 | (2006.01) | |
| C04B 111/00 | (2006.01) | |
| C08K 3/22 | (2006.01) | |

(52) U.S. Cl.
CPC .......... *C09D 5/084* (2013.01); *C04B 41/009* (2013.01); *C04B 41/5089* (2013.01); *C04B 41/85* (2013.01); *C09D 7/43* (2018.01); *C09D 7/61* (2018.01); *C09D 7/67* (2018.01); *C09D 7/69* (2018.01); *C09D 105/00* (2013.01); *C04B 2111/00879* (2013.01); *C08K 3/36* (2013.01); *C08K 2003/2227* (2013.01)

(58) Field of Classification Search
None
See application file for complete search history.

(56) References Cited

U.S. PATENT DOCUMENTS

| | | |
|---|---|---|
| 5,147,830 A | 9/1992 | Banerjee |
| 5,234,507 A | 8/1993 | Sato |
| 5,422,323 A | 6/1995 | Banerjee |
| 5,494,267 A | 4/1996 | Anderson |
| 5,505,893 A | 4/1996 | Connors, Jr. |
| 5,584,921 A | 12/1996 | Wagner et al. |
| 5,632,937 A | 5/1997 | Soofi |
| 5,944,888 A | 8/1999 | Perich |
| 6,387,832 B1 | 5/2002 | Komarneni |
| 6,528,011 B2 | 3/2003 | Connors, Sr. |
| 6,773,770 B1 | 8/2004 | Sugiyama et al. |
| 7,176,153 B2 | 2/2007 | Anderson |
| 7,500,511 B2 | 7/2009 | Connors |
| 7,562,694 B2 | 7/2009 | Connors, Jr. |
| 8,128,996 B2 | 3/2012 | Davies et al. |
| 8,505,335 B2 | 8/2013 | Connors, Sr. |
| 8,505,336 B2 | 8/2013 | Connors, Jr. |
| 9,334,196 B2 | 5/2016 | Connors, Jr. et al. |
| 9,376,575 B2 | 6/2016 | Connors, Jr. et al. |
| 9,512,042 B2 | 12/2016 | Connors, Jr. et al. |
| 2002/0001604 A1 | 1/2002 | Shigera et al. |
| 2002/0158373 A1 | 10/2002 | Prior, Jr. et al. |
| 2004/0058166 A1 | 3/2004 | Nakamura |
| 2004/0077768 A1 | 4/2004 | Greenwood |
| 2005/0210615 A1 | 9/2005 | Shastry et al. |
| 2005/0214720 A1 | 9/2005 | Milanovich et al. |
| 2005/0276923 A1 | 12/2005 | Davies et al. |
| 2007/0140986 A1 | 6/2007 | Prencipe et al. |
| 2007/0269650 A1 | 11/2007 | Leuninger et al. |
| 2007/0272382 A1 | 11/2007 | Becker et al. |

(Continued)

FOREIGN PATENT DOCUMENTS

| | | |
|---|---|---|
| CN | 102976775 A | 3/2013 |
| DE | 4141186 A1 | 6/1992 |

(Continued)

OTHER PUBLICATIONS

Sorrell et al, (Assessment of Non-Wetting Materials for Use in Refractories for Aluminum Melting Furnaces, Journal of the Australian Ceramic Society vol. 51[1], pp. 139-145 (Year: 2015).*

(Continued)

*Primary Examiner* — Colin W. Slifka

(74) *Attorney, Agent, or Firm* — Maxwell J. Petersen; FisherBroyles LLP

(57) ABSTRACT

The invention is directed to a method of providing a protective coating composition that protects a refractory wall or lining from chemical attack by molten aluminum and molten alkali metals. The method includes the steps of coating a refractory wall or liner with an aqueous protective composition that includes, by weight of the solids, about 20-90% $Al_2O_3$ (excluding calcined alumina), about 15-55% $SiO_2$ and about 1-15% of a metallic non-wetting agent; and evaporating the water before contacting the protective coating with the reactive molten metal.

16 Claims, No Drawings

(56) References Cited

U.S. PATENT DOCUMENTS

2012/0031300 A1 2/2012 Olsen et al.
2012/0294825 A1 11/2012 Ehara et al.
2014/0209268 A1* 7/2014 Bewlay .................... B22C 9/04
164/529

FOREIGN PATENT DOCUMENTS

| DE | 102008003640 A1 | 7/2009 | | |
|----|----|----|----|----|
| EP | 0165754 A2 | 12/1985 | | |
| EP | 0763392 A2 * | 3/1997 | .............. | B22C 1/00 |
| EP | 0 952 194 A2 | 10/1999 | | |
| EP | 1 186 637 A1 | 3/2002 | | |
| EP | 1 299 482 B1 | 8/2006 | | |
| GB | 2147893 A | 5/1985 | | |
| JP | 11209862 A | 8/1999 | | |
| RU | 2533509 C1 | 11/2014 | | |
| WO | WO 2013/034158 A1 | 3/2013 | | |
| WO | 2015173620 A1 | 11/2015 | | |

OTHER PUBLICATIONS

European Search Report, dated Nov. 29, 2017.
R. Hashemi-Nasab et al., "Effect of Silica Nanoparticles Surface Treatment on In Situ Pollymerization of Sytrene-Butyl Acrylate Latex", Progress in Organic Coatings, 2013, v. 7 pp. 1016-1023.

* cited by examiner

METHOD OF PROVIDING A PROTECTIVE COATING COMPOSITION FOR MOLTEN ALUMINUM AND ALKALI METAL ENVIRONMENTS

RELATED APPLICATIONS

This patent application is a continuation-in-part of U.S. patent application Ser. No. 15/235,774, the disclosure of which is incorporated by reference.

FIELD OF THE INVENTION

This invention is directed to a method of providing a protective coating composition that can be easily applied to molten metal containment vessels by brushing, rolling, spraying or the like. The composition protects the vessel walls against corrosion and other degradation caused by exposure to molten aluminum and alkali metals and vapors contained in the vessel.

BACKGROUND OF THE INVENTION

Molten aluminum and molten alkali metals and vapors are known to attack refractory walls and linings made of alumina, silica, magnesia, magnesite, chromite, and other materials. Prolonged exposure to these molten metals and vapors promotes corrosion and degradation of various parts of furnaces and other containment vessels, including walls, ceilings, roofs, exhaust ducts, floors, ramps, skim shelves, spouts, tap holes, troughs, runners, launders, lentils, door jams, and doors. In the past, this required periodic replacement of the refractory linings and/or the containment vessels. This periodic replacement often entailed significant down time and expense.

Only a small amount of corrosion and degradation is required to adversely affect the thermal insulation properties of the refractory wall or lining. When the refractory wall or lining is formed of alumina-silicate, as is commonly the case, the molten aluminum chemically reacts with the refractory to form corundum, which is a mixture of $Al_2O_3$ with unreacted Si and Al. This reaction product strongly attaches itself to the refractory by filling its porosity, and is very difficult to remove.

By way of example, molten aluminum reacts with silica in the refractory wall or lining as follows:

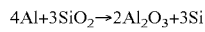
$$4Al+3SiO_2 \rightarrow 2Al_2O_3+3Si$$

If the molten aluminum is a metal-bearing alloy, such as an aluminum-magnesium alloy, the following additional reactions may occur:

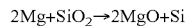
$$2Mg+SiO_2 \rightarrow 2MgO+Si$$

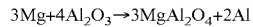
$$3Mg+4Al_2O_3 \rightarrow 3MgAl_2O_4+2Al$$

Other oxides frequently found in refractories are also reduced by reaction with molten aluminum and alkali metals and vapor. These include oxides of titanium and iron, for example. There is a need or desire for an easy-to-apply coating that protects refractory walls and linings from chemical attack by molten aluminum and alkali metals and vapors.

SUMMARY OF THE INVENTION

The present invention is directed to a method of providing an aqueous protective coating composition that can be easily applied to any ceramic or masonry surface by brushing, rolling, spraying or the like, and subsequently dried. The invention is also directed to a method of providing the dried coating composition. The dried coating composition protects the ceramic or masonry surface from chemical attack from molten aluminum and/or alkali metals and vapors.

The methods includes the steps of a) combining and mixing a quantity of synthetic or natural gum with a quantity of water to provide a first mixture, b) combining and mixing the first mixture with an aqueous colloidal silica dispersion to provide a second mixture; and c) adding mullite, calcined alumina and a metallic non-wetting agent to the second mixture, and mixing the ingredients together to form the aqueous protective coating composition. The composition is then applied to a substrate and dried to provide the protective coating.

The dried protective coating composition includes the following ingredients:
about 20% to about 90% by weight $Al_2O_3$;
about 15% to about 55% by weight $SiO_2$; and
about 1% to about 40% by weight of a metallic non-wetting agent; wherein the $Al_2O_3$, $SiO_2$, and non-wetting agent together constitute at least about 90% by weight of the protective coating composition.

The aqueous coating composition includes about 5% to about 40% by weight water and about 60% to about 95% by weight solids. The solids include, on a dry weight basis:
about 20% to about 90% by weight $Al_3O_3$ (excluding calcined alumina);
about 15% to about 55% by weight $SiO_2$; and
about 1% to about 15% by weight of a metallic non-wetting agent;
wherein the $Al_2O_3$, $SiO_2$, and non-wetting agent together constitute at least about 90% by weight of the solids.

Some of the $Al_2O_3$ and $SiO_2$ are suitably in the form of mullite, having the chemical formula $3Al_2O_3.2SiO_2$. Some of the silica is suitably added with the water in the form of colloidal silica. Some of the alumina can be in the form of calcined alumina. The non-wetting agent is believed to combine with the $Al_2O_3$ and $SiO_2$ to form a combination which resists penetration and reaction with molten aluminum and alkali metals and vapors, thereby providing the protective coating.

With the foregoing in mind, it is a feature and advantage of the invention to provide a protective coating composition for molten aluminum and alkali metal environments that can be easily applied and re-applied to a ceramic or masonry surface by brushing, spraying, rolling or similar techniques.

It is also a feature and advantage of the invention to provide an environmentally safe protective coating composition that is substantially free of organic components.

It is also a feature and advantage of the invention to provide a protective coating composition for molten aluminum and alkali metal environments that is relatively inexpensive to formulate, purchase, apply to a substrate, and use.

These and other features and advantages of the invention will become further apparent from the following detailed description of the invention.

DETAILED DESCRIPTION OF THE INVENTION

The invention is directed to a method of providing an aqueous protective coating composition that can be easily applied to a concrete or masonry surface by brushing, spraying, rolling or the like and subsequently dried. The invention is also directed to a method of providing the dried protective coating composition that provides effective protection in molten aluminum and alkali metal environments.

The dried protective coating composition comprises about 20% to about 90% by weight $Al_2O_3$. Suitably, the dried protective coating composition includes about 30% to about 70% by weight $Al_2O_3$, or about 40% to about 60% by weight $Al_2O_3$. The dried protective coating composition comprises about 15% to about 55% by weight $SiO_2$, suitably about 25% to about 50% by weight $SiO_2$, or about 30% to about 45% by weight $SiO_2$.

Some or all of the $Al_2O_3$ and some of the $SiO_2$ can be provided as mullite having the chemical formula $3Al_2SO_3.2SiO_2$. The mullite can be micronized to a median particle diameter of about 1-100 microns, suitably about 2-10 microns. One suitable commercially available mullite is MJ5M micronized mullite, available from the Kyanite Mining Corporation in Dillwyn, Va. MJ5M micronized mullite has a median particle diameter of about 4-9 microns and contains about 55-60% by weight $Al_2O_3$, about 38-43% by weight $SiO_2$, less than about 1% by weight $Fe_2O_3$, about 1-2% by weight $TiO_2$, and less than about 1% by weight alkali and alkaline earth metal oxides (e.g., CaO, MgO, $Na_2O$, $K_2O$). The mullite may constitute about 30% to about 70% by weight of the dried protective coating composition, suitably about 40% to about 60% by weight. The micronized mullite primarily benefits the stability of the wet mixture, helping to keep the ingredients in suspension instead of settling out.

Some or all of the $Al_2O_3$ and some of the $SiO_2$ can be provided as mullite having the chemical formula $3Al_2SO_3.2SiO_2$. The mullite can be micronized to a median particle diameter of about 1-100 microns, suitably about 2-10 microns. One suitable commercially available mullite is MJ5M micronized Mullite, available from the Kyanite Mining Corporation in Dillwyn, Va. MJ5M Micronized Mullite has a median particle diameter of about 4 to about 9 microns and contains about 55-60% by weight $Al_2O_3$, about 38-43% by weight $SiO_2$, less than about 1% by weight $Fe_2O_3$, about 1-2% by weight $TiO_2$, and less than about 1% by weight alkali and alkaline earth metal oxides (e.g., CaO, MgO, $Na_2O$, $K_2O$). The mullite may constitute about 30% to about 70% by weight of the dried protective coating composition, suitably about 40% to about 60% by weight. The use of micronized mullite improves the particle packing and the stability of the dried protective coating composition.

As an alternative to MJ5M micronized mullite, it has been found advantageous to use a mixture of micronized mullites having smaller and larger particle sizes. The micronized mullite mixture has the advantage of being able to reduce the porosity of the protective coating composition by filling pores and voids that would otherwise be left open. In one embodiment, 325-mesh micronized mullite (325M) having a larger median particle diameter of about 10-15 microns can be mixed with MJ5M micronized mullite having a smaller median particle diameter of about 4-9 microns. One suitable micronized mullite mixture contains about 10 to about 50% by weight of the smaller micronized mullite and about 50 to about 90% by weight of the larger micronized mullite, or about 20 to about 30% by weight of the smaller micronized mullite and about 70 to about 80% by weight of the larger micronized mullite.

In one embodiment, micronized mullite having the following particle size distributions can be comined in any of the above weight ratios, or a weight ratio of about 25% smaller micronized mullite and about 75% larger micronized mullite.

| Smaller Micronized Mullite (MJ5M) | |
|---|---|
| d10 | 1.28 microns |
| d50 | 6.83 microns |
| d90 | 21.72 microns |
| Larger Micronized Mullite (325M) | |
| d10 | 1.58 microns |
| d50 | 11.43 microns |
| d90 | 43.87 microns |

In the above example, the designation "d50" means that 50% of the smaller micronized mullite had a diameter of 6.83 microns or less, and 50% of the larger micronized mullite particles had a diameter of 11.43 microns or less. The designators "d10" and "d90" have corresponding percentage-based meanings. This combination of smaller and larger micronized mullite particles has been shown to provide some reduction in porosity compared to using either the smaller or the larger micronized mullite alone.

Some of the $Al_2O_3$ can be calcined alumina, suitably having a median particle size of about 1 to about 50 microns, or about 2 to about 25 microns, or about 3 to about 10 microns. When calcined alumina is present, the dried protective coating composition may include about 5% to about 40% by weight calcined alumina, or about 15% to about 35% by weight calcined alumina, or about 20% to about 30% by weight calcined alumina. One suitable calcined alumina is sold under the name AC2-325M, available from AluChem, Inc. of Reading, Ohio. Calcined alumina can be purchased or made by calcining aluminum powder at 1200-1300° C. to convert it to pure $Al_2O_3$.

Some of the $SiO_2$ can be colloidal silica having a median particle diameter of about 1-100 nanometers, suitably about 4-100 nanometers, or about 6-50 nanometers, or about 8-20 nanometers. The colloidal silica is provided in an aqueous colloidal suspension that includes about 30-60% by weight colloidal silica particles and about 40-70% by weight water, suitably about 40% by weight colloidal silica particles and about 60% by weight water. When the protective coating composition is dried, the colloidal silica particles act as a binder between the remaining ingredients and to the substrate. The colloidal silica particles may constitute about 5% to about 30% by weight of the dried protective coating composition, suitably about 10% to about 25% by weight.

In one embodiment, the particle sizes of the colloidal silica can be optimized in order to reduce the porosity of the protective coating composition by filling pores and voids that would otherwise be left open. Smaller colloidal silica particles having a median particle diameter of 1 to less than 50 nanometers, or about 5 to about 20 nanometers, can be combined with larger colloidal silica particles having a median particle diameter of about 50 to about 100 nanometers, or about 60 to about 80 nanometers. Suitable weight ranges are from about 10 to about 90% smaller colloidal silica particles and about 10 to about 90% by weight larger colloidal silica particles, or about 20 to about 80% by weight smaller colloidal silica particles and about 20 to about 80%, by weight larger colloidal silica particles.

The dried protective coating composition includes about 1% to about 15% by weight of a metallic non-wetting agent, suitably about 3% to about 13% by weight, or about 5% to about 12% by weight. The metallic non-wetting agent is non-wetting as to molten aluminum and alkali metals and vapors, and resists wetting by these metals. It is believed that the metallic non-wetting agent combines with the alumina and/or silica in the protective coating composition to provide the overall composition with non-wetting properties and substantial chemical inertness to molten aluminum (including aluminum-based alloys) and alkali metals and vapors.

A wide variety of metallic non-wetting agents can be employed in the protective coating composition. Examples of metallic non-wetting agents include metal phosphates such as lanthanum phosphate, trisodium phosphate, tetrasodium phosphate, sodium pyrophosphate, magnesium phosphate, potassium phosphate, barium phosphate, iron (III) phosphate, copper (III) phosphate, iron (II) phosphate, calcium phosphate, nickel (II) phosphate, strontium phosphate, aluminum phosphate, aluminum hydrogen phosphate, aluminum dihydrogen phosphate, aluminum pyrophosphate, aluminum perphosphate, aluminum metaphosphate, and combinations thereof. When heated to temperatures above 980° C. to temperatures characteristic of an aluminum melting furnace, these phosphates can combine with the alumina to form an aluminum orthophosphate bond, providing the protective coating composition with a high degree of resistance to molten metal attack.

Other examples of metallic non-wetting agents include zirconium silicates such as zirconium metasilicate (Zr(SiO$_3$)$_2$) and zirconium orthosilicate (ZrSiO$_4$); Group II metal sulfates such as barium sulfate, strontium sulfate, calcium sulfate and magnesium sulfate; and combinations thereof. These compounds may decompose at high temperatures to form oxides which in turn, react with alumina to form stable oxides phases. For example, barium sulfate decomposes into barium oxide (BaO) at high temperatures, which in turn combines with the alumina to form barium hexaluminate (BaO.6Al$_2$O$_3$) or the monaluminate spinel (BaO.Al$_2$O$_3$), both of which are stable and resistant to molten metal attack.

Other examples of metallic non-wetting agents include Group II metal halides such as barium fluoride, barium chloride, barium bromide, strontium fluoride, strontium chloride, strontium bromide, calcium fluoride, calcium chloride, calcium bromide, magnesium fluoride, magnesium chloride, magnesium bromide, and combinations thereof. These compounds are thermodynamically stable, with relatively high heats of formation, and exhibit non-wetting and de-wetting behavior at temperatures exceeding 1100° C.

Other examples of metallic non-wetting agents include metallic nitrides such as boron nitride, zirconium nitride, aluminum nitride, silicon nitride, and the like; metallic carbides such as barium carbide, aluminum carbide, tungsten carbide, tungsten-nickel carbide complexes, and the like; and combinations thereof. These compounds are thermodynamically stable at high temperatures, and are non-wetting and resistant to chemical reaction with molten aluminum and alkali-based metals.

Other examples of metallic non-wetting agents include compounds and complexes of aluminum and/or silicon that combine with the Al$_2$O$_3$ and/or SiO$_2$ to provide reduced wetting and increased resistance to attack by molten aluminum and alkali metals and vapors. Examples include without limitation magnesium aluminate spinel (MgAl$_3$O$_4$); stack structures of alumina and zirconia such as ZrO$_2$.Al$_2$O$_3$, ZrO$_2$.Al$_2$O$_3$.ZrO$_2$, and Al$_2$O$_3$.ZrO$_2$.Al$_2$O$_3$; aluminum halides such as aluminum fluoride aluminum chloride, aluminum bromide, sodium aluminum tetrafluoride, sodium aluminum tetrachloride, sodium aluminum tetrabromide, potassium aluminum tetrafluoride, potassium aluminum tetrachloride, and potassium aluminum tetrabromide; calcium aluminate, calcium hexaluminate (C$_a$O.6Al$_2$O$_3$), aluminum titanate (Al$_2$TiO$_5$), calcium silicate, and combinations thereof.

Other examples of metallic non-wetting agents include Group II metal carbonates and celsians such as barium carbonate, strontium carbonate, barium celsian, strontium celsian, and combinations thereof. Also included are fluorides, chlorides and bromides of titanium, zirconium, hafnium, copper and strontium, and combinations thereof.

The Al$_2$O$_3$, SiO$_2$, and non-wetting agent together should constitute at least about 90% by weight, or at least about 94% by weight, or at least about 97% by weight of the dried protective coating composition. All other ingredients (including impurities, if any) should be kept to a minimum.

The dried protective coating composition may also include about 0.01% to about 2% by weight, suitably about 0.01% to about 1% by weight of a water-soluble thickening agent. Suitable thickening agents include without limitation water-soluble synthetic or natural gums which help maintain the solid ingredients in suspension before drying. Suitable gums include without limitation xanthan gum, guar gum, alginates, locust bean gum, and combinations thereof. One suitable gum is xanthan gum sold under the name KELZAN® by CP Kelco Co. of Atlanta, Ga.

Except for the thickening agent, the dried protective coating composition is either free or substantially free of organic ingredients. When present, the sum of all organic ingredients, inclusive of the thickening agent, is suitably not more than about 8% by weight, or not more than 5% by weight, or not more than about 2.5% by weight of the dried protective coating composition. The relative absence of organic components promotes a healthy and safe work environment. The protective coating compositions should also be free or substantially free of gelling agents, acidic compounds, alkali hydroxides and other strong bases.

The present invention also includes the aqueous protective coating composition prior to drying. The aqueous protective coating composition comprises about 5% to about 40% by weight water, suitably about 10% to about 30% by weight water, or about 15% to about 25% by weight water. Most or all of the water is combined with colloidal silica in the amounts indicated above, to form an aqueous colloidal dispersion. The aqueous colloidal dispersion is then mixed with the remaining ingredients of the protective coating composition to form an aqueous protective coating composition including about 60% to about 95% by weight solids, suitably about 70% to about 90% by weight solids, or about 75% to about 85% by weight solids. Water can be the only liquid component. The aqueous protective coating composition should be free, or substantially free, of organic liquids. The term "substantially free" indicates an organic liquid content of not more than about 8% by weight, or not more than about 5% based on the total liquid weight.

The aqueous colloidal silica dispersion and the remaining solid ingredients are mixed together to form an aqueous protective coating composition which, excluding the water, contains the same solid ingredients in the same amounts as described above for the dried protective coating composition. The aqueous protective coating composition is then applied to a ceramic or masonry surface using brushing, spraying rolling, or another suitable technique. After application, the aqueous protective coating composition is dried with or without heat to provide the dried protective coating having the composition described above.

EXAMPLE 1

An aqueous protective coating composition was prepared by mixing the following materials together in the following amounts.

| No. | Ingredient | Weight Percent |
|---|---|---|
| 1 | Xanthan Gum (KELZAN ®) | 0.051 |
| 2 | Water | 1.698 |
| 3 | Aqueous Colloidal Silica, 40% Silica | 35.350 |
| 4 | Micronized Mullite, 58% $Al_2O_3$, 40% $SiO_2$ (MJ5M) | 37.740 |
| 5 | Calcined Alumina, 6 microns (AC2-325M) | 16.983 |
| 6 | Metallic Non-wetting Agent | 8.177 |
| | TOTAL | 100.00 |

Broken down by ingredients, the aqueous protective coating composition contained the following:

| No. | Ingredient | Weight Percent |
|---|---|---|
| 1 | Xanthan Gum (KELZAN ®) | 0.051 |
| 2 | Water | 22.908 |
| 3 | Colloidal Silica | 14.140 |
| 4 | Silica from Mullite | 15.096 |
| 5 | $Al_2O_3$ from Mullite | 21.890 |
| 6 | Impurities from Mullite | 0.755 |
| 7 | Calcined Alumina | 16.983 |
| 8 | Metallic Non-wetting Agent | 8.177 |
| | TOTAL | 100.00 |

The aqueous protective coating composition can be provided as a two part system, with one part containing wet ingredients and the other part containing dry ingredients. In one embodiment, the aqueous protective coating composition can be prepared by first combining and mixing the synthetic or natural gum (ingredient 1) with water (ingredient 2) to provide a first mixture. The first mixture can be combined with the aqueous colloidal silica (40% silica) in a separate container using a stirring blade for about 5 minutes, or the time needed to achieve homogeneity, to provide a second mixture. The mullite, calcined alumina and non-wetting agent can then be slowly added to the second mixture and stirred for about 10 minutes, or a time needed to achieve homogeneity. The resulting aqueous protective coating composition can settle during prolonged storage, and can be stirred again prior to use.

The aqueous protective coating composition can then be applied to a concrete or masonry surface, such as a refractory wall or lining used to contain molten aluminum in a furnace or vessel. After drying, the resulting dried protective coating has the following composition.

| No. | Ingredient | Percent by Weight |
|---|---|---|
| 1 | Xanthan Gum | 0.067 |
| 2 | Colloidal Silica | 18.342 |
| 3 | Silica from Mullite | 19.582 |
| 4 | $Al_2O_3$ from Mullite | 28.421 |
| 5 | Impurities from Mullite | 0.980 |
| 6 | Calcined Alumina | 22.031 |
| 7 | Metallic Non-wetting Agent | 10.607 |
| | TOTAL | 100.00 |

EXAMPLE 2

An aqueous protective coating composition prepared according to Example 1 was coated on one side of a 65% alumina refractory cup that had been pre-filled to 1832° F. The other side of the cup was uncoated. The cup was then filled with a 7075 molten aluminum alloy mixed with 2.5% magnesium and was maintained at a temperature of 1562° F. for 120 hours. The cup was then emptied and observed. The coated side of the cup showed no visual evidence of reaction with the molten metal. The uncoated side of the cup showed substantial visual evidence of corrosion and degradation.

EXAMPLE 3

Using the low cement castable (LCC) refractory cups, one cup was fully coated with the aqueous refractory composition of Example 1 and the other cup was left uncoated. Both cups were filled with $K_2CO_3$, sealed, and heated to 1100° C. (2012° F.) for five hours in a sealed sagar. Then, the cups were emptied and inspected. The coated cup showed no visual evidence of reaction with the molten alkali metal. The uncoated cup showed substantial visual evidence of corrosion and degradation.

The embodiments of the invention described herein are exemplary. Various modifications and improvements can be made without changing the spirit and scope of the invention. The scope of the invention is indicated by the appended claims, and all changes that fall within the meaning and scope of equivalents are intended to be embraced therein.

We claim:

1. A method of providing a protective coating composition comprising about 5% by weight to about 40% by weight water and about 60% to about 95% solids, comprising the steps of:
    providing an aqueous colloidal silica suspension that includes about 30-60% by weight colloidal silica particles and about 40-70% by weight water based on the weight of the aqueous colloidal silica suspension;
    providing solid ingredients including quantities of $Al_2O_3$, $SiO_2$, a metallic non-wetting agent and a water-soluble thickening agent; and
    causing the solid ingredients to be mixed with the aqueous colloidal silica suspension to provide the protective coating composition;
    wherein the metallic non-wetting agent constitutes 3% to 13% by weight of the solids in the protective coating composition and
    at least some of the $Al_2O_3$ and $SiO_2$ are provided as micronized mullite having a median particle size of 2 to 10 microns and constituting about 30% to about 70% by weight of the solids.

2. The method of claim 1, wherein the water-soluble thickening agent comprises a synthetic or natural gum and constitutes about 0.01% to about 2% by weight of the solids.

3. The method of claim 1, wherein the colloidal silica provides about 10% to about 25% by weight of the solids in the protective coating composition.

4. The method of claim 1, wherein the metallic non-wetting agent is selected from the group consisting of metal phosphates, zirconium silicates, Group II metal sulfates, Group II metal halides, metallic nitrides, and combinations thereof.

5. The method of claim 1, wherein the metallic non-wetting agent is selected from the group consisting of magnesium aluminate spinel, $ZrO_2.Al_2O_3$, $ZrO_2.Al_2O_3.ZrO_2$, $Al_2O_3.ZrO_2.Al_2O_3$, aluminum halides, aluminum titanate, and combinations thereof.

6. The method of claim 1, wherein the metallic non-wetting agent is selected from the group consisting of Group II metal carbonates; Group II metal celsians; fluorides, chlorides and bromides of titanium, zirconium, halfnium, copper and strontium; and combinations thereof.

7. The method of claim 1, wherein the $Al_2O_3$ constitutes about 30% to about 70% by weight of the solids and the $SiO_2$ constitutes about 25% to about 50% by weight of the solids, in the protective coating composition.

8. The method of claim 1, wherein the protective coating composition comprises about 10% to about 30% by weight of the water and about 70% to about 90% by weight of the solids.

9. The method of claim 1, wherein the protective coating composition is free of organic components except for the water-soluble thickening agent.

10. The method of claim 1, wherein the micronized mullite is provided in the form of $3Al_2O_3.2SiO_2$.

11. The method of claim 10, wherein the micronized mullite comprises about 55-60% by weight $Al_2O_3$, about 38-43% by weight $SiO_2$, less than about 1% by weight $Fe_2O_3$, about 1-2% by weight $TiO_2$, and less than about 1% by weight alkali and alkaline earth metal oxides.

12. The method of claim 11, wherein at least some of the $Al_2O_3$, is provided as calcined alumina and the calcined alumina constitutes about 15% to about 35% by weight of the solids in the protective coating composition.

13. The method of claim 12, wherein the mullite, colloidal silica, calcined alumina and metallic non-wetting agent together constitute at least about 94% by weight of the solids.

14. The method of claim 12, wherein the mullite, colloidal silica, calcined alumina, and metallic non-wetting agent together constitute at least about 97% by weight of the solids in the protective coating composition.

15. The method of claim 1, further comprising the steps of applying the protective coating composition to a refractory substrate and evaporating the water from the protective coating composition.

16. The method of claim 15, further comprising the step of contacting the protective coating composition with molten aluminum or alkali metal vapor.

* * * * *